US005742049A

United States Patent [19]

Holle et al.

[11] Patent Number: 5,742,049

[45] Date of Patent: Apr. 21, 1998

[54] METHOD OF IMPROVING MASS RESOLUTION IN TIME-OF-FLIGHT MASS SPECTROMETRY

[75] Inventors: Armin Holle, Oyten; Claus Köster, Lilienthal; Jochen Franzen, Bremen, all of Germany

[73] Assignee: Bruker-Franzen Analytik GmbH, Bremen, Germany

[21] Appl. No.: 618,843

[22] Filed: Mar. 20, 1996

[30] Foreign Application Priority Data

Dec. 21, 1995 [DE] Germany ........................ 195 47 949.1

[51] Int. Cl.$^6$ ............................ B01D 59/44; H01J 49/00

[52] U.S. Cl. ............................................ 250/282; 250/287

[58] Field of Search .................................... 250/282, 287

[56] References Cited

U.S. PATENT DOCUMENTS

| | | | |
|---|---|---|---|
| 4,295,046 | 10/1981 | Grutter et al. | 250/287 |
| 4,625,112 | 11/1986 | Yoshida | 250/287 |
| 4,731,532 | 3/1988 | Frey et al. | 250/287 |
| 5,017,780 | 5/1991 | Kutscher et al. | 250/287 |
| 5,032,722 | 7/1991 | Boesl et al. | 250/287 |
| 5,065,018 | 11/1991 | Bechtold et al. | 250/287 |
| 5,144,127 | 9/1992 | Williams et al. | 250/287 |
| 5,300,774 | 4/1994 | Buttrill, Jr. | 250/287 |

FOREIGN PATENT DOCUMENTS

| | | |
|---|---|---|
| 3842044 | 6/1990 | Germany . |
| 2239985 | 7/1991 | United Kingdom . |
| WO9533279 | 12/1995 | WIPO . |

OTHER PUBLICATIONS

Pierre Voumard et al., *A new instrument for spatially resolved laser desorption/laser multiphoton ionization mass spectrometry,* Rev. Sci. Instrum., vol. 64, No. 8, pp. 2215–2220, Aug. 1993.

Eric D. Erickson et al., *Mass Dependence of Time-Lag Focusing in Time-of-Flight Mass Spectrometry—An Analysis,* International Journal of Mass Spectrometry and Ion Processes, vol. 97, pp. 87–106, 1990.

A. Duckworth et al., *Analysis of laser-ablated solid samples using a small time of flight mass spectrometer,* Meas. Sci. Techno., vol. 3, pp. 596–602, 1992.

*Primary Examiner*—Bruce Anderson

[57] ABSTRACT

The invention relates to the use of a time-of-flight mass spectrometer to analyze substance molecules which are ionized by laser desorption, particularly by matrix-assisted laser desorption (MALDI). In detail it relates to the process for improving mass resolution by the known method of delayed acceleration (sometimes called delayed extraction) of the ions, and devices for the performance of this method. The invention consists of using an optical device with gridless apertures for the acceleration of the ions and refocusing the ion beam divergence due to the lens effect of the apertures, by means of a lens arrangement in the drift region of the time-of-flight spectrometer. For laser light pulses, illumination, and observation, there are further lateral holes in the electrodes of the optical device.

8 Claims, 3 Drawing Sheets

METHOD OF IMPROVING MASS RESOLUTION IN TIME-OF-FLIGHT MASS SPECTROMETRY

SUMMARY

The invention relates to the use of a time-of-flight mass spectrometer to analyze substance molecules which are ionized by laser desorption, particularly by matrix-assisted laser desorption (MALDI). In detail it relates to the process for improving mass resolution by the known method of delayed acceleration (sometimes called delayed extraction) of the ions, and devices for the performance of this method.

The invention consists of using an optical device with gridless apertures for the acceleration of the ions and refocusing the ion beam divergence due to the lens effect of the apertures, by means of a lens arrangement in the drift region of the time-of-flight spectrometer. For laser light pulses, illumination, and observation, there are further lateral holes in the electrodes of the optical device.

PRIOR ART

The usual method of time-of-flight mass spectrometry with ionization by laser-induced desorption consists of subjecting the sample support loaded with substance molecules to a constant high voltage of 6 to 30 kilovolts while facing a ground potential base electrode at a distance of about 10 to 20 millimeters. A laser light pulse with a typical duration of about 4 nanoseconds which is focused on the sample surface generates ions of the substance molecules which leave the surface with a large spread of velocities and are immediately accelerated toward the base electrode through the electric field formed by the potential difference. Ions passing the base electrode through apertures enter the relatively long field-free drift section of the time-of-flight mass spectrometer, there flight time is measured at the end of the drift tube by an ion detector.

For the ionization of large sample molecules using matrix-assisted laser desorption (MALDI) the large analyte substance molecules are deposited on the sample support in a layer of minute crystals of a low molecular weight matrix substance. The laser light pulse heats up very rapidly a small amount of matrix substance, gasifying analyte and matrix substances in situ. The very dense vapor cloud then expands in a quasi-explosive process. Inside the vapor cloud only a very small part of the molecules, of both the matrix and the large analyte substance molecules, is ionized. During vapor cloud expansion ionization of the large analyte substance molecules continues at the expense of smaller matrix ions, due to ion molecule reactions. The vapor cloud expanding into the vacuum not only accelerates the molecules and ions of the matrix substance through its adiabatic expansion, but also the molecules and ions from the analyte substance through viscous entrainment. During the cloud expansion process the ions achieve average velocities of about 700 meters per second; the velocities are largely independent of the mass of the ions, but have a large velocity spread which extends from about 200 to 2,000 meters per second. It can be assumed that the neutral molecules in the cloud also possess these velocities. The large spread of velocities with both types of laser-induced ionization—with and without matrix material—limits the mass resolution of the time-of-flight mass spectrometers. Even if high acceleration voltages are used which reduce the spread of initial velocities relative to the average velocity, the resolution of linear time-of-flight spectrometers is restricted to values in the order of $R \sim 600$ $m/\Delta m$. In addition to the above mentioned velocity distribution of the ions, there is a spatial and temporal distribution for the generation of the ions by ion molecule reactions, so that even in time-of-flight mass spectrometers with energy-focusing reflectors the resolution is limited, because distributions of the start potentials and initial ion creation times cannot both be offset with a reflector simultaneously.

The fundamental principle for an improvement in the mass resolving power under such conditions of velocity spread has been known for more than 40 years already. The method together with its theoretical principles and an experimental confirmation has been published in the article W. C. Wiley and I. H. McLaren, "Time-of-Flight Mass Spectrometer with Improved Resolution", Rev. Scient. Instr. 26, 1150/1955

The authors termed the method "time lag focusing". More recently it has been examined under various names (for example "delayed extraction" and "pulsed ion extraction") in scientific articles relating to MALDI ionization.

Recent publications such as

R. S. Brown and J. J. Lennon, "Mass Resolution Improvement by Incorporation of Pulsed Ion Extraction in a Matrix-Assisted Laser Desorption/Ionization Linear Time-of-Flight Mass Spectrometer", Anal. Chem, 67, 1998, (1995)

or

R. M. Whittal and L. Li, "High-Resolution Matrix-Assisted Laser Desorption/Ionization in a Linear Time-of-Flight Mass Spectrometer", 67, 1950, (1995)

may be regarded as the state of the art in current technology.

The principle of the method of improving resolution is simple: the molecules and ions of the cloud are allowed to fly at first for a brief time in a drift region without any electrical acceleration. Faster molecules and ions thereby separate themselves farther from the sample support electrode than slow ones, and from the velocity distribution of the ions a location distribution results. Only then is the acceleration of the ions suddenly initiated through a homogeneous acceleration field, i.e. with a linearly declining acceleration potential. The faster ions then have a larger distance from the sample support electrode, consequently, at the onset of the acceleration, they find themselves at a somewhat reduced acceleration potential, which results in a somewhat lower ultimate velocity for the drift section in the time-of-flight spectrometer than the ions which were initially slower. With correct selection of the time lag for the start of acceleration the initially slower, but after acceleration faster ions catch up to the initially faster, but after acceleration slower ions, directly at the detector. Ions of equal mass are consequently focused, in first order, at the location of the detector with respect to their flight time.

As a result, it is no longer important whether the ions have already formed during the laser light pulse, or after this event in the expanding cloud through ion-molecule reactions, as long as this formation takes place within the time before the acceleration potential is switched on. Since the velocity of the molecules is virtually unchanged by the ion-molecule reactions, those ions which were initially released as fast neutral molecules are also focused by this method.

For reasons of good temporal resolution, time-of-flight spectrometers are operated at very high acceleration voltages of up to 30 kilovolts. The switching of such high voltages for extremely short times of only a few nanoseconds is still almost unattainable even today and is associated with high costs. The authors of the 1955 article have already shown however that the total acceleration voltage need not be switched. Switching of a partial voltage suffices, requiring an intermediate electrode in the acceleration path. Only the area between the sample support electrode and the intermediate electrode need initially be field-free and then switched over into an acceleration field after a delay. The authors of the most recent publications also use intermediate electrodes.

To switch on the acceleration field, so far it has always been the potential of the sample support electrode which has been switched, and this was also the case with the authors of the two recent articles. As will be realised, the switching range is dependent on the distance between the intermediate electrode and the sample support because for the same acceleration field the voltage difference to be switched is the smaller, the smaller the electrode distance.

The term "high" potential, or "high voltage" always refers, in this context, to a potential which repels the ions and therefore accelerates them towards the drift tube. It can be a positive potential if the ions are positive and the drift tube is on ground potential, or it may be a negative potential if the ions are negative.

Because quick switching of the voltage is technically all the easier to manage and all the more cost-effective, the smaller the switchable voltage, it is advantageous to position the intermediate electrode as closely as possible in front of the sample support electrode. Nevertheless there is also a lower limit for this distance, since the fastest ions must always remain in the drift region during the delay.

Since the fastest ions however only move at velocities of about 2,000 meters per second, and the delay according to the literature may only amount to about 1 microsecond at a maximum, the maximum flight path of the fastest ions during the field-free time lag is only about 2 millimeters. In practice, the distance of about 2 to 4 millimeters is selected between the intermediate electrode and the sample support electrode.

An intermediate electrode at such a short distance from the sample support however impairs access for the focused laser light beam. Since it is also desirable, as already offered in commercial mass spectrometers, to observe the sample during analysis via a microscope aided by a television camera, access for a light beam for illumination and a clear view of the sample are also impaired.

Prior art for this method consists in using a large area, very transparent, meshed metal grid as an intermediate electrode, at a distance of about 3 millimeters from the sample support electrode. The meshed grid generates a very homogeneous acceleration field in front of the sample support electrode. The large area meshed grid allows the laser light pulse to also pass through this grid. Microscopic observation is also performed throught this meshed grid. Both the author groups of the most recent cited articles use this type of meshed grids for both the intermediate and the base electrode (see e.g. FIG. 1 in Brown and Lennon's article).

This arrangement nevertheless has disadvantages. The laser light pulse liberates electrons from the meshed grid, the acceleration of which leads to interfering ions via impact with the residual gas. Observation suffers from considerable impairment of contrast, which is not very high anyway during this type of sample observation, due to a "curtain effect". The meshed grid can indeed be manufactured with good transparency, but even then however retains a portion of the ions. With more than one grid, the losses increase exponentially with the number of grids. Even with highly transparent grids of 80% transparency, only ⅔ of the ions still remain with two grids. At the grid of the intermediate electrode secondary ions are liberated which are accelerated in the field between the intermediate electrode and the base electrode, causing background noise. Another drawback results from the inhomogeneous fields inside the grid meshs. These inhomogeneities cause small-angle scattering of the ions leading to diffuse expansion of the beam which can no longer be corrected by lenses.

The purpose of striving for good mass resolution is not only to achieve good mass determination or attain statements regarding the presence of heteroatoms characteristic of an isotope by way of the visibly resolved isotopic pattern. A good mass resolution always provides an improved signal-to-noise ratio at the same time. In this way the analytic method becomes more sensitive and smaller substance amounts can be analyzed. Furthermore, a resolved isotope pattern can immediately tell the number of charges on the ions.

OBJECTIVE OF THE INVENTION

A method and a device for implementation of the known method is to be found for improving the resolution of time-of-flight mass spectrometers by delayed acceleration of the ions using desorption ion sources, which contain no disturbing grids and offer nevertheless good access for the laser light pulses. Also, as free access as possible should prevail for illumination light and observation.

DESCRIPTION OF THE INVENTION

To this day many specialists in time-of-flight mass spectrometry, including those in manufacturers' development departments, are still sceptical about the introduction of gridless reflectors for ion velocity focusing, although the latter has long since been successful theory and practice. Indeed it contradicts the intuition that fringe ion beams which do not pass through the same potential distribution are again accurately temporally focused and thereby, in addition to an advantageous spatial focusing, also retain the property of velocity focusing. Up to very recently, the known programs for calculating ion trajectories in arbitrary potential distributions did not contain any calculations, and particularly not any visual representations whatsoever for the temporal focusing of ions of the same mass, and it is only ever the spatial trajectories and spatial focal points which are represented.

In principle the same applies to gridless ion source optical devices which are to be used for time-of-flight mass spectrometry. Here too specialists generally resort to parallel grids, which are indeed capable of building up genuinely homogeneous fields. To date many specialists do not believe that a gridless optical device, with its inhomogeneous fields, can have the same good properties, or even better properties than an optical device made up of flush grids. All the authors of the articles cited above use grid type optical devices.

It is therefore still surprising to the specialist that with a gridless optical device for the intermediate electrode and the base electrode it is still possible to realize the method of improving mass resolution by delayed acceleration with enormous success, despite of a large angle of aperture. With a circular aperture of 1 millimeter in diameter and at a distance of only 3 millimeters a mass resolving power in the order of $m/\Delta m_b = R_b = 6000$ can be achieved in a linear time-of-flight mass spectrometer only 1.6 meters long. These are figures which represent 10 times the resolution of normal linear time-of-flight mass spectrometers and even surpass those of grid type optical devices. The resolution $R_b$ relates, as usual, to the full width $\Delta m_b$ at half maximum (FWHM).

However, these apertures in the intermediate electrode and base electrode act as a divergent lens, and their effect has to be compensated by an additional convergent lens. The convergent lens used can be a single Einzel lens. It should be located at the beginning of the field-free drift tube adjacent to the base electrode.

The invention thus consists of using a desorption ion source with an intermediate electrode, whereby the intermediate electrode and the base electrode have gridless apertures for the passage of the ions, and compensating the beam divergence resulting from the apertures by means of a lens arrangement in the drift region after the base electrode. It is thereby apparent that circular apertures in the electrode and lenses are particularly favorable.

To switch on the acceleration field, either the sample support electrode potential or the intermediate electrode potential can be switched over. The authors of both recent articles switch over the sample support electrode potential. Due to the electrical capacitance of the electrodes, which is generally very much higher for the sample support electrode than for the intermediate electrode, it is nevertheless better to keep the sample support electrode constantly at the total acceleration potential and only switch over the intermediate electrode potential. This is set at the full acceleration potential for the time of the ionization by the laser light pulse and is lowered after the time lag, which in practice only amounts to about 100 to 300 nanoseconds, by several kilovolts through sudden switching of the voltage.

Optimization of resolution normally takes place by setting two parameters: the delay time for switching on and the acceleration field strength after switching on. For the MALDI ions, which all have roughly the same mean velocity, however, resolution can only be optimized for a single ion mass—for ions of different masses the optimum is at a slightly different combination of time lag and switching voltage.

In principle it is also possible to apply a weak field before switching. Then, before switching, there is no longer complete field-freedom in the space in front of the sample support but a slight acceleration or deceleration field. Consequently the ions are already influenced by a slightly decelerating or slightly accelerating field before the acceleration is switched on. With such a weak field before the delayed switch-on of the acceleration it is possible to achieve favorable effects. For example, the ambipolar acceleration by the electrons can be suppressed, or the light matrix ions can be pushed back and thus discriminated. The main effect, however, is a movement of the matrix ions through the cloud by ion mobility, thereby increasing the number of ion-molecule collisions and thus the yield of analyte ions.

However, it is possible to use the method to improve mass resolution by delaying acceleration not only in linear time-of-flight mass spectrometers. In time-of-flight mass spectrometers with velocity focusing reflectors an improvement is also possible with the same method in principle but under completely different operating conditions, as described in detail in a co-pending patent application, identified by U.S. Patent Office Ser. No. 08/627,370. The descriptive text of that patent application should be included at this point in full. Here too a gridless optical device has proved successful.

It is a further idea of the invention to provide the intermediate electrode and the base electrode not only with a center aperture to allow passage of the ion beam but also with lateral apertures through which the laser light pulse and illumination light can be admitted. Other apertures permit observation. With an aperture diameter of 1 millimeter in the intermediate electrode, a solid strip of 0.2 millimeters adjacent to the aperture, and a distance of 2.5 millimeters between the intermediate electrode and the sample support electrode, angles of incidence can be realized which approach 16° relative to normal for the edging beams of incident light. Angles of incidence for the central beams in the order of approx. 30° thus be easily achieved for the laser light and the observation. Such acute angles of admission are regarded as favorable. For observation purposes this means better imaging of the sample surface.

The lateral apertures are best designed and arranged so as to be radially symmetrical so that no asymmetric potential distortion is generated. Symmetries with two, three or more counts can be used. We prefer a four-count symmetry, whereby two apertures which are at right angles to each other are used for illumination light and observation. This arrangement avoids reflecting dazzle and enhances the contrast for observing the MALDI sample. Dazzle by the laser light pulse can be avoided in a similar manner.

However, the intermediate electrode does not necessarily have to be flush. It may advantageous to design the intermediate electrode in the form of a skimmer which contains the aperture for the passage of ions at its tip. Such an arrangement permits very small distances for the intermediate electrode without affecting the admission of light. A radially symmetric dent which faces away from the sample support may also prove advantageous. Light can be admitted through wall apertures in the dent, without the apertures distorting the potential just in front of the sample support electrode.

The optical resolution of the optical device for observation depends on the ratio between the aperture of the object lens and the distance of the object lens from the sample surface. For a given object lens the distance must be as short as possible. Since the object lens cannot be accommodated in the acceleration path due to possible distortion of potential, it is favorable to place the object lens in the drift region directly behind the base electrode. An optimal arrangement places the object lens perpendicular to the ion beam axis, with a deflection of observation by a mirror.

DETAILED DESCRIPTION OF THE PREFERRED EMBODIMENTS

Figure 1:
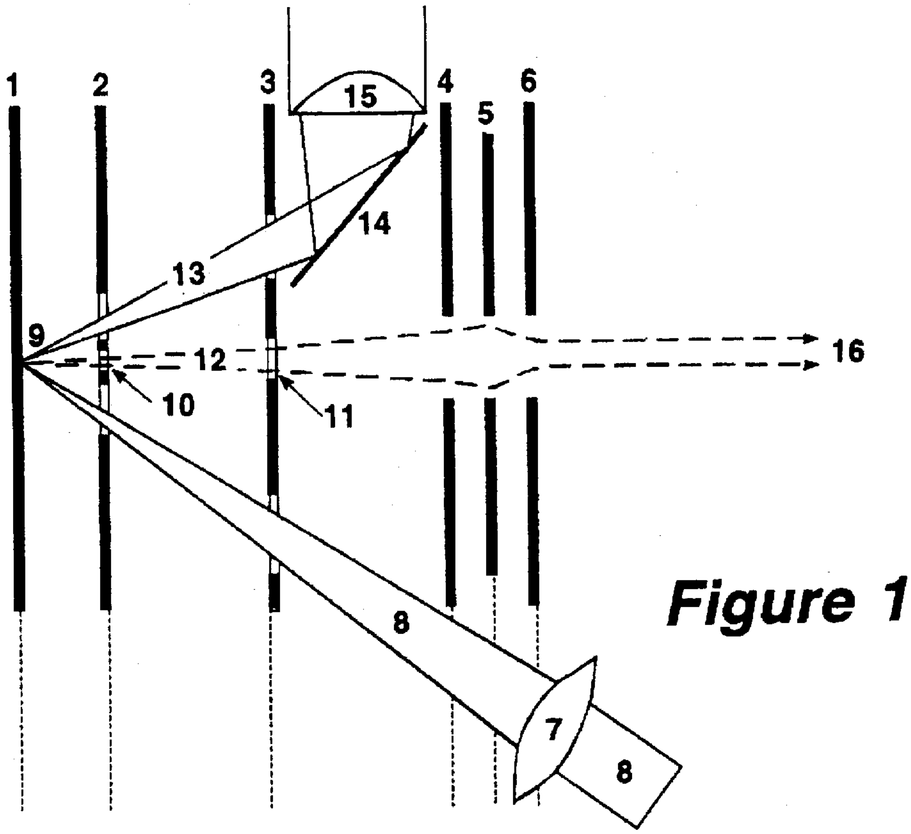
FIG. 1 is a schematic view of an ion source suitable for performing the method of the present invention.

FIG. 1 shows the ion source for the method of increasing mass resolution by delayed acceleration of the ions:

1=Electrically conductive sample support at constant high voltage potential

2=Intermediate electrode with switched potential

3=Base electrode at ground potential
4, 6=External electrodes of the Einzel lens, both at ground potential
5=Center electrode of the Einzel lens, at lens potential
7=Focusing lens for the laser light pulse
8=Beam of laser light pulse
9=Sample application to the sample support
10=Gridless aperture in the intermediate electrode
11=Gridless aperture in the base electrode
12=Ion beam, defocused by the apertures and focused by the lens
13=Observation field of view
14=Observation mirror
15=Observation lens
16=Ion beam in the flight tube of the time-of-flight mass spectrometer.

Figure 2A:
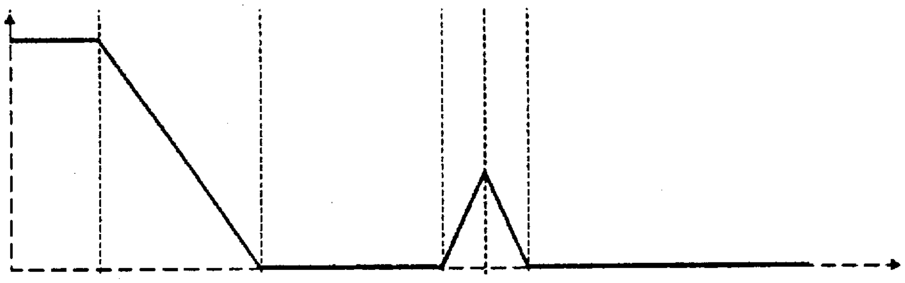
FIGS. 2*a* and 2*b* show the distribution of potentials of the different components of the ion source before and after a predetermined time delay, respectively.

FIG. 2*a* shows the characteristic of potential from the sample support into the flight path for the time before switching, i.e. from the time of the laser light pulse up to the switching on of acceleration potential.

Figure 2B:
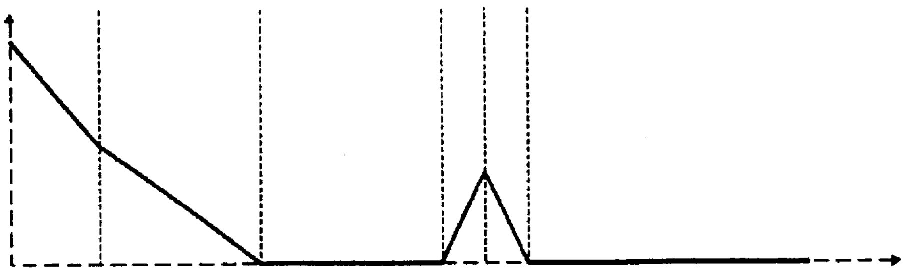

FIG. 2*b* shows the potential characteristics after switching on acceleration voltage.

Figure 3:
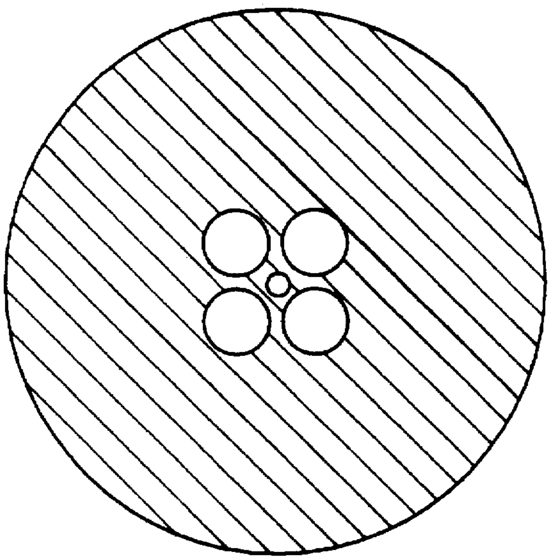
FIG. 3 is a schematic view of the intermediate electrode of the ion source arrangement of FIG. 1.

FIG. 3 shows the intermediate electrode with the small, center aperture for the ion beam, and four larger, radially symmetrical apertures which can be used for laser light pulse, illumination light, and observation.

Figure 4:
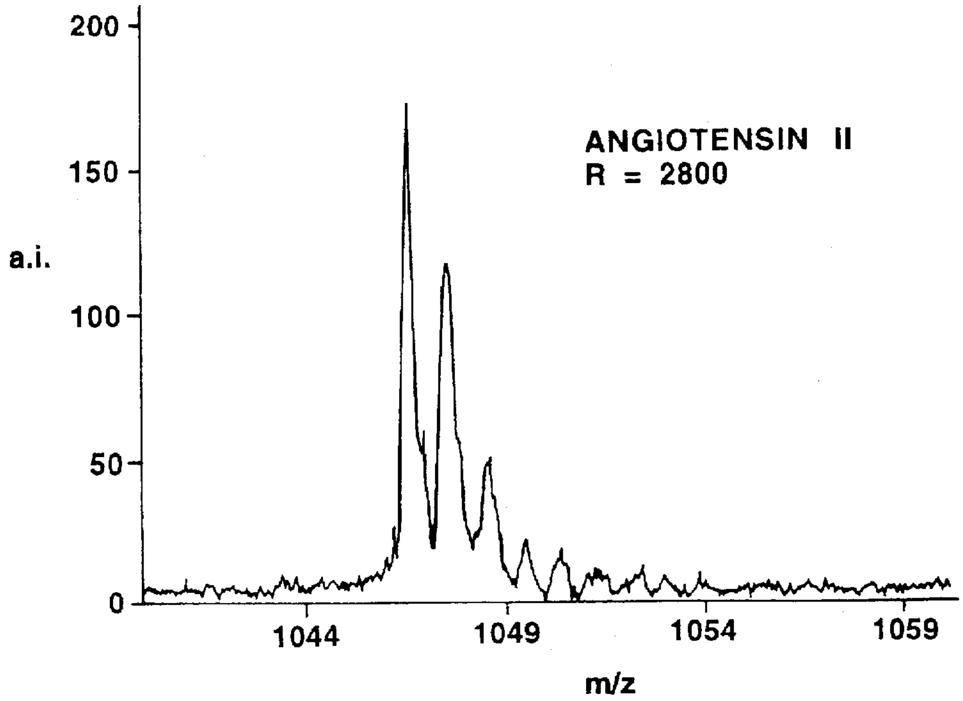
FIG. 4 shows a mass spectrum for Angiotensin II using the method of the present invention.
Figure 5:
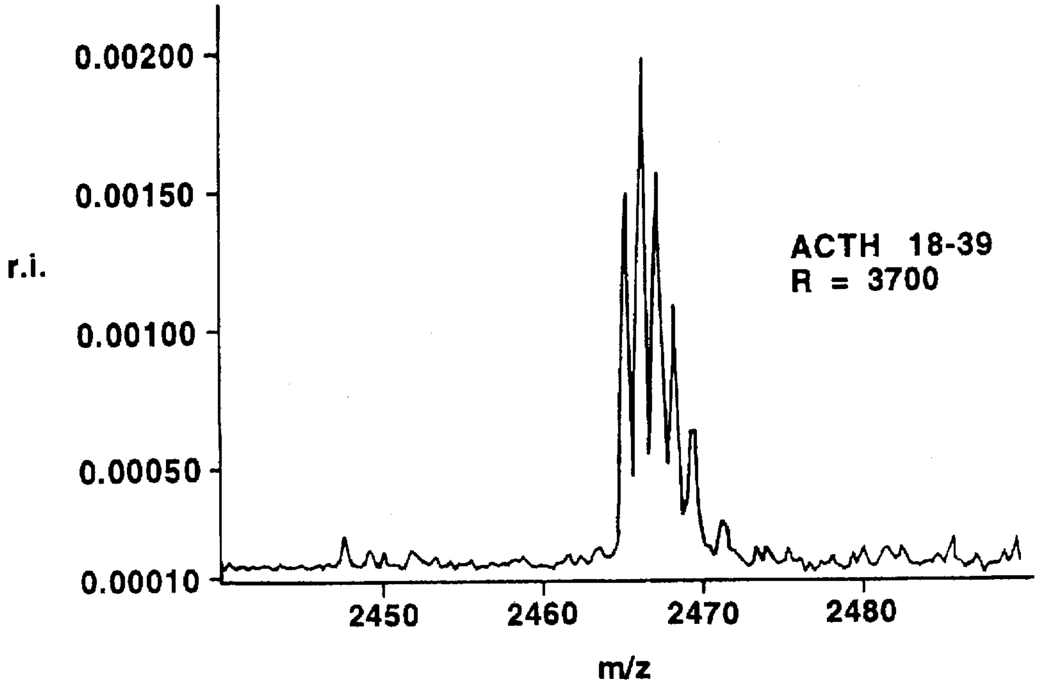
FIG. 5 shows a mass spectrum of ACTH using the method of the present invention.
Figure 6:
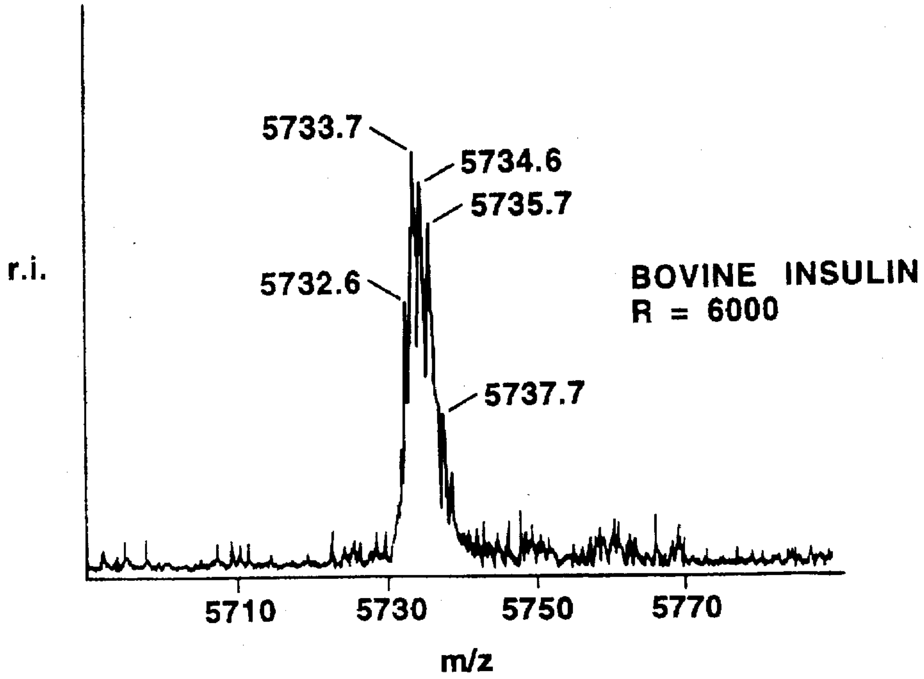
FIG. 6 shows a mass spectrum of Bovine insulin using the method of the present invention.

FIGS. 4, 5 and 6 show three scans of substances with very different molecular masses, which also produce different mass resolutions. Angiotensin II shows a resolution (R) of 2,800, RCTH produces a mass resolution (R) of 3,700, and bovine insulin produces a resolution (R) of 6,000. All the scans were made with a linear time-of-flight spectrometer at a flight length of one meter. The resolutions correspond to about 10 times that of what can be achieved by delayed acceleration without increasing resolution.

Particularly favorable embodiments

A particularly favorable embodiment is shown schematically in FIG. 1. The sample substance 9 is applied, together with a matrix substance in the form of a thin crystal layer, on the surface of a sample support 1. The sample support can be brought through a vacuum lock into the vacuum of the mass spectrometer and contact is automatically made with the high voltage feeder (not shown) there. The sample support can be moved in x–y direction using a moving device (not shown) parallel to its sample surface. In this way several samples 9 can be placed next to one another and analyzed one after another.

The ion source consists of sample support 1, the intermediate electrode 2, the potential of which is connected according to this invention, and base electrode 3, which is at the potential of the flight tube. The flight tube (not shown) consists of the flight path of the time-of-flight spectrometer. It is generally at ground potential. At the beginning of the flight path, directly behind the base electrode, there is an Einzel lens which consists of front electrode 4, terminating electrode 6, both at the potential of the flight tube, and the center electrode 5 at lens potential. To keep the lens voltage smaller for the same focusing effect, it has proved useful to make the center electrode thicker. Two center electrodes at the same potential can also be used. A more complex design of lenses with several potentials, or even an arrangement comprising several Einzel lenses is possible but it has not proved advantageous enough to justify the extra effort in terms of potential supply.

According to this invention the intermediate electrode 2 has a gridless, central, circular aperture 10, and the base electrode 3 has a centered, circular aperture 11. The accelerated ion beam passes through these apertures.

For performing the method the following dimensions have proved successful:

3 millimeters distance between sample support 1 and intermediate electrode 2;

1 millimeter diameter for aperture 10 in the intermediate electrode 2;

12 millimeters distance between intermediate electrode and base electrode;

2 millimeters diameter for aperture 11 in the base electrode 3;

8 millimeters distance between the base electrode and lens plate 4;

4 millimeters distance between each of lens plates 4, 5 and 6;

5 millimeters diameter for the apertures in each of lens plates 4, 5 and 6;

4 millimeters thickness for lens plate 5.

At the beginning of the procedure, sample support 1 and intermediate electrode 2 are both at the high acceleration potential of about 30 kilovolts. Base plate 3 and the two lens plates 4 and 6 are at ground potential. The center electrode of the lens is at a previously optimized lens potential of about 10 to 15 kilovolts. The potential characteristic is shown in FIG. 2*a*. A slight improvement in the method can be achieved if the intermediate electrode is not located exactly at the high-voltage potential of the sample support but at a slightly different potential.

The sample is now irradiated by a brief laser pulse of about 4 nanoseconds in duration. The laser light pulse is focused by lens 7 onto the sample surface, resulting in light beam 8. The laser light pulse stems from a laser (not shown). Low-cost nitrogen lasers which produce light at a wavelength of 337 nanometers have proved particularly successful. A favorable dosage is at values of about 50 microjoules.

As has already been described above, a small amount of matrix and sample substance vaporizes, forming a cloud which explosively expands adiabatically into the surrounding vacuum. Some ions from the sample analyte substance form during the vaporization process, others form later in the cloud due to ion-molecule reactions in which the ions from the matrix are involved. Acceleration of all the molecules is essentially generated by the adiabatic expansion of the cloud which essentially consists of molecules from the matrix substance. The heavier molecules and ions from the sample substance are accelerated within the exploding cloud due to viscous entrainment, and therefore all the molecules and ions have about the same velocity distribution, ranging from about 200 to 2,000 meters per second, with a maximum at about 700 meters per second. The cloud plasma is first neutral, since positive as well as negative ions, as well as some electrons, are present. Since the electrons quickly escape from the plasma, a slightly ambipolar acceleration of fringe ions takes place in the fringe areas which the escaping electrons generate between themselves and the remaining plasma. This effect is however minimal.

The process of the adiabatic expansion of the cloud lasts only about 30 to 100 nanoseconds, depending on the density of the cloud. After this time, all contact between the molecules is lost due to the thinning of the cloud, and further acceleration no longer takes place. The velocity distribution is thereby frozen and there are no more ion-molecule reactions.

After a selectable time lag, the potential of the intermediate electrode is switched down to a new potential dependent on time lag, as shown in FIG. 2*b*. We use a potential supply which can be switched with a delay of 100 to 300 nanoseconds at a potential range of up to 8 kilovolts with a switching speed of 8 nanoseconds for the potential. Favorable values for raising resolution are at approx. 120 nanoseconds and switching ranges of 5 kilovolts.

Until acceleration is switched on, the fast ions have flown further away from the sample support than the slow ones. When acceleration is switched on they are therefore at a lower potential and are no longer given the full acceleration by the high voltage. As already described above, this effect leads to a temporal focusing of ions of the same mass in a focus plane, the position of which can be set by time lag and acceleration field. If the location is accurately set to the ion detector, all the ions of the same mass arrive there simultaneously despite different velocities inside the cloud and this therefore produces the desirable increase in mass resolution.

As already indicated above, the potential of the intermediate diaphragm does not necessarily have to be exactly at the high-voltage level of the sample support when the cloud is generated. It may be more favorable to have a weak field here. With slightly different potentials the penetration of the strong field between the intermediate electrode and the base electrode can be minimized, or the analyte ion yield can be maximized. Certain other desirable effects can be generated by small fields in the space between the sample support and the intermediate electrode. In this way the above-mentioned ambipolar acceleration can be avoided by the escaping electrons. Or the light matrix ions can be discriminated from the heavier ones by pushing them back, thereby also increasing the yield of analyte ions. When switching over to the measurement of negative ions it has proved favorable to reoptimize this weak field.

In commercially available MALDI mass spectrometers it has now become possible to observe the sample on the sample support microscopically. The equipment for this is indicated in FIG. 1. It consists of a video camera (not shown) and a microscope, of which only object lens 15 is shown schematically. A mirror 14 directs observation at the sample. The illumination light (not shown) comes from the side.

For admitting a laser light pulse and illumination light and for observation purposes there are other apertures in the intermediate electrode in addition to the center aperture 10 for the ion beam. Depending on the angle of these beams there are also similar apertures in the base plate. However, grids can also be used which admit laser light and illumination light, permitting observation. It is particularly favorable to use two apertures at right angles to one another for illumination and observation in order to avoid reflections of light at the sample support plate into the microscope and to increase contrast.

The example given here of an ion source and a method according to this invention may naturally be varied in many ways. The specialist in the development of mass spectrometers, especially in the development of desorption ion sources, can easily implement these variations. FIGS. 4 to 6 show measurements of mass spectra with MALDI methods, which were scanned using delayed acceleration. The linear time-of-flight spectrometer has a length of about one meter.

We claim:

1. A method for generating a parallel ion beam for use in an analysis of analyte substances in a time-of-flight mass spectrometer, the method comprising:

providing a gridless ion source including: a sample support electrode; an intermediate electrode substantially parallel to the sample support electrode, the intermediate electrode having a gridless central aperture through which the ion beam may pass and an adjacent lateral aperture through which laser light may pass; and a base electrode substantially parallel to the intermediate electrode and having a gridless aperture through which the ion beam may pass;

locating an analyte substance on the support sample electrode;

vaporizing and ionizing a portion of the analyte substance with laser energy directed through the lateral aperture of the intermediate electrode;

applying a first set of predetermined voltages to the electrodes such that, immediately following said vaporizing and ionizing, a substantially field free region exists between the sample support electrode and the intermediate electrode, and a strong acceleration field exists in the region between the intermediate electrode and the base electrode;

applying a second set of predetermined voltages to the electrodes after said first set such that, a predetermined amount of time after said vaporizing and ionizing, a strong acceleration field exists between the sample support electrode and the intermediate electrode; and focusing the ion beam after its passage through the apertures with an electrostatic lens arrangement.

2. A method according to claim 1 wherein locating an analyte substance on the support sample electrode comprises locating the analyte substance on the support together with a matrix substance such that the step of vaporizing and ionizing a portion of the analyte substance comprises matrix assisted laser desorption and ionization (MALDI).

3. A method according to claim 1 further comprising providing additional apertures in the intermediate electrode to allow the sample surface to be illuminated and observed by a microscope.

4. A method according to claim 1 wherein applying a second set of predetermined voltages to the electrodes comprises switching the voltage potential of the intermediate electrode to create the delayed switching on of the acceleration field strength.

5. A method according to claim 4 further comprising providing a fixed potential supply for the sample support electrode and an adjustable, switchable potential supply for the intermediate electrode, which permits a higher potential than that of the sample support electrode.

6. A method according to claim 1 wherein providing a gridless ion source further comprises providing gridless apertures in the intermediate and base electrodes which are circular.

7. A method according to claim 1 wherein providing a gridless ion source comprises arranging the lateral apertures in a radially symmetric manner.

8. A method according to claim 1 further comprising providing the time-of-flight spectrometer with at least one ion reflector.

* * * * *